United States Patent [19]

Glennon et al.

[11] Patent Number: 4,489,323
[45] Date of Patent: Dec. 18, 1984

[54] CONTROL FOR ELECTRICAL POWER CONVERSION SYSTEM

[75] Inventors: Timothy F. Glennon; David J. Hucker, both of Rockford, Ill.; Charles M. Lenny, Billerica, Mass.

[73] Assignee: Sundstrand Corporation, Rockford, Ill.

[21] Appl. No.: 464,420

[22] Filed: Feb. 7, 1983

[51] Int. Cl.³ .............................................. H02P 13/24
[52] U.S. Cl. ..................................... 363/87; 363/129; 322/29
[58] Field of Search ................... 318/762, 803; 322/29, 322/32, 90, 94; 363/84, 85, 87, 128, 129

[56] References Cited

U.S. PATENT DOCUMENTS

3,486,102  12/1969  Wilkerson .
3,514,689   5/1970  Giannamore .
4,042,873   8/1977  Cox .
4,161,022   7/1979  kanazawa et al. .
4,245,292   1/1981  Kalinichenko et al. .

Primary Examiner—William M. Shoop
Assistant Examiner—Jeffrey L. Sterrett
Attorney, Agent, or Firm—Wood, Dalton, Phillips, Mason & Rowe

[57] ABSTRACT

An electrical power system has a variable speed multi-phase alternator. A multi-phase full wave rectifier with controlled rectifier elements converts the electrical power to DC. The DC voltage is regulated by a control circuit which determines the angle of conduction of the rectifier elements. If the alternator frequency is excessive, the controlled rectifier elements are not reliably commutated. The control circuit compares the alternator frequency with a reference. When the frequency is above a selected value, rectifier operation is modified either for half wave rectification or for full wave rectification of less than all of the phases from the alternator. Additional switching time is provided, improving reliability.

13 Claims, 9 Drawing Figures

CONTROL FOR ELECTRICAL POWER CONVERSION SYSTEM

DESCRIPTION

1. Technical Field

The present invention relates generally to a power conversion system wherein a variable frequency AC generator output is converted to a regulated DC voltage, and more particularly to a circuit for controlling silicon controlled rectifiers (or SCR's) which convert n-phase AC power into DC power.

2. Background Art

In prior power conversion systems, a variable speed prime mover is coupled to and drives an n-phase alternator which develops variable frequency Ac power. The n-phase variable frequency power is rectified in a full-wave SCR bridge and is filtered to generate a DC output. The firing angle of each SCR is controlled to regulate the DC voltage.

In the case of a three-phase alternator, the full-wave SCR bridge includes six silicon controlled rectifiers each of which is gated into conduction by control pulses which are timed by means of feedback circuitry to maintain the DC output at a constant level.

When the speed of the prime mover is such that the period of the alternator output is of the same order as the SCR switching time, operation is unreliable.

SUMMARY OF INVENTION

In accordance with the present invention, the above noted disadvantage is overcome by sensing the frequency of the output of the alternator and reducing the rate of operation of the SCR's when the frequency of the alternator is above a predetermined frequency.

One phase of the output from the alternator is converted into a DC signal having a level proportional to the frequency of the alternator output. This DC signal is compared with a reference in a comparator and when the DC signal is less than the reference, SCR's in a multiphase full-wave bridge rectifier are operated by control pulses in a conventional fashion to convert the n-phase AC output of the alternator into DC power. However, when the DC voltage representing the frequency of the alternator is greater than the reference, the timing of the control pulses is modified to operate the SCR's for less than n-phase full-wave rectification. Thus, additional time is gained to reliably fire the SCR's and thereby accurately control the DC output level.

In one form of the invention, an n-phase full-wave rectifier is converted to an n-phase half-wave rectifier. In an alternative embodiment of the invention, one or more pairs of SCR's in the bridge associated with one or more phases of the alternator are disabled, thereby converting an n-phase full-wave rectifier into an m-phase full-wave rectification, where m is less than n.

DESCRIPTION OF THE PREFERRED EMBODIMENT

Figure 1:
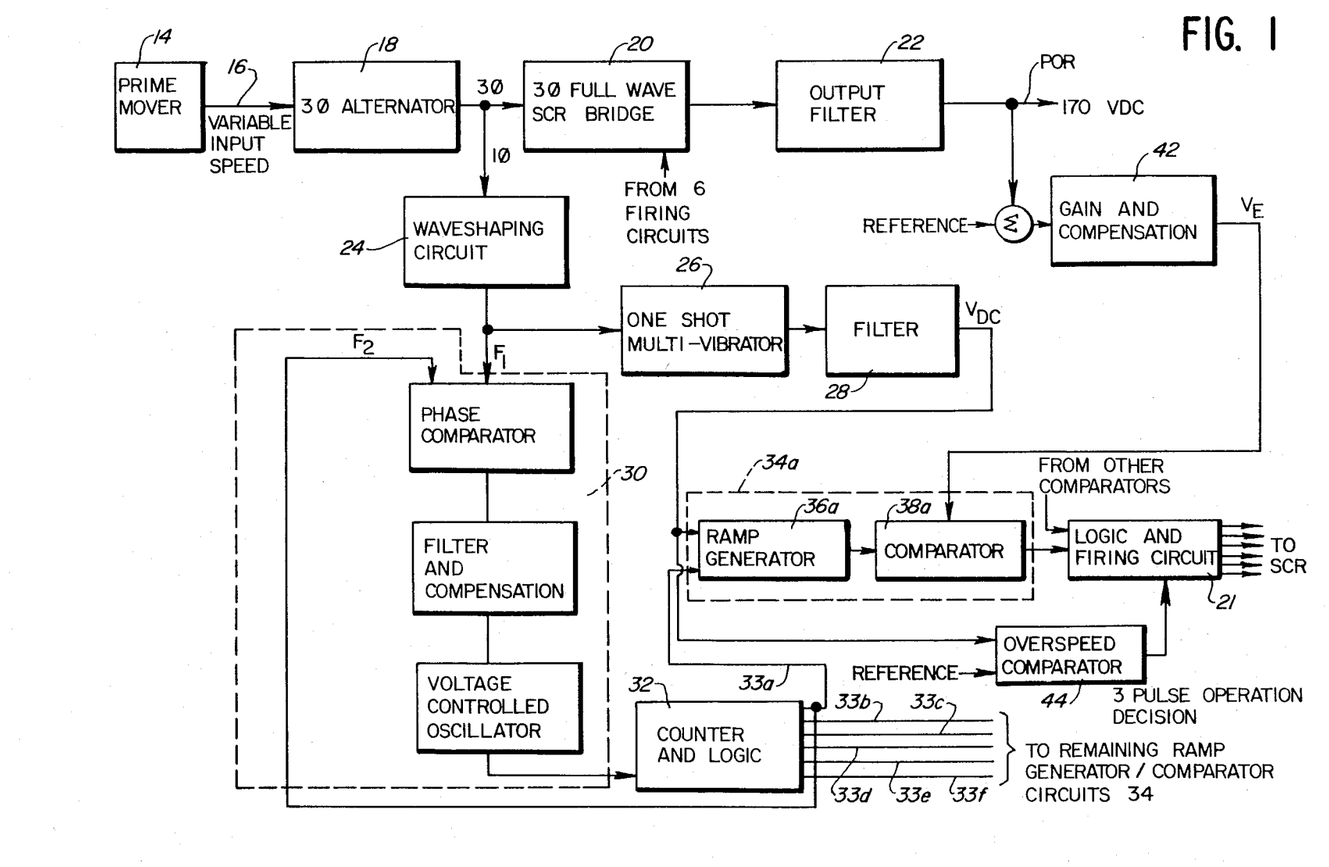
FIG. 1 is a block diagram of a power conversion system utilizing the SCR control circuit of the present invention.
Figure 2:
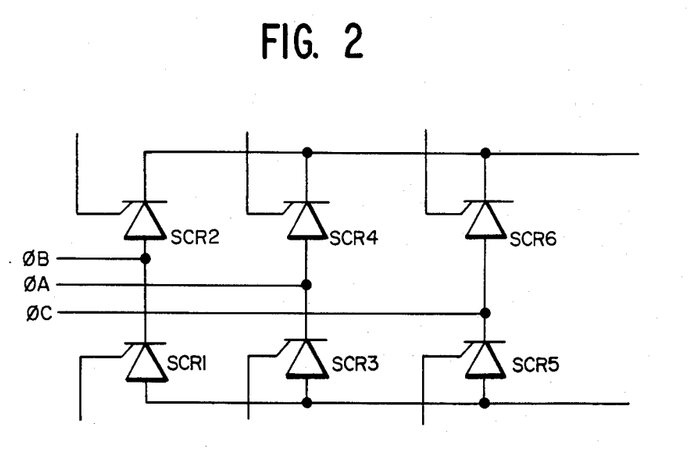
FIG. 2 is a simplified schematic diagram of the three-phase full-wave SCR bridge shown in block form in FIG. 1.

Referring now to FIG. 1, there is illustrated a power conversion system and the SCR control circuit of the present invention. A variable speed prime mover 14 has an output shaft shown schematically at 16. The shaft 16 is coupled to and drives a three-phase alternator 18 which develops AC output power, the frequency of which is dependent upon the speed of the prime mover 14. The three-phase output of the alternator 18 is coupled to a three-phase full-wave bridge 20, shown in simplified form in FIG. 2, which comprises controlled rectifier elements SCR1–SCR6.

The three-phase full-wave bridge 20 receives control pulses from a logic and firing circuit 21 to control the firing angle of each of the rectifier elements SCR1–SCR6. The full-wave bridge 20 develops a DC output which is filtered by an output filter 22.

It should be noted that the power conversion system shown in FIG. 1 is not limited to AC-DC conversion of three-phase alternating voltage, and in fact may be used with an n-phase alternator, in which case an n-phase full-wave bridge would be substituted for the bridge 20 shown in FIG. 1, with the n-phase bridge containing 2n controlled rectifier elements. It is also applicable to cycloconverters.

The firing pulses for the rectifier elements SCR1–SCR6 in the bridge 20 are developed by control circuitry which senses the output DC voltage from the filter 22 and instructs the logic and firing circuit 21 to provide firing pulses at the appropriate point in each phase waveform to maintain the DC output level from the filter 22 at the regulated value.

The control circuitry includes a wave shaping circuit 24 which converts one phase of the three-phase alternator output into a square wave. A one-shot multivibrator 26 senses the zero crossing of the square-wave from the circuit 24 and develops a pulse each time a zero crossing is detected. A filter 28 converts the pulses developed by the multivibrator 26 into a DC level $V_{DC}$ which is proportional to the frequency of the alternator output.

It should also be noted that since the frequency of the output of the alternator is dependent upon prime mover speed, the signal $V_{DC}$ also represents the speed of the prime mover. An alternative method of deriving the signal $V_{DC}$ would be to sense the speed of the prime mover directly and convert the sensed speed into a DC signal.

A phase locked loop, or PLL 30, develops a constant frequency output from the square-wave from circuit 24 which is coupled to a counter and logic circuit 32. The circuit 32 develops a series of six pulse trains on six lines 33a–33f, all of which are at the same frequency but differ by 60° in phase. One of the pulse trains is returned back to the PLL 30 for phase comparison with the waveform from the circuit 24.

Each of the pulse trains from the logic circuit 32 is coupled to one of six ramp generator/comparator circuits 34, one of which 34a is shown in FIG. 1. Each circuit 34 receives the DC signal $V_{DC}$ representing the output frequency of the alternator 18 and one of the pulse trains from the counter and logic circuit 32 and generates a ramp signal therefrom. In particular, the voltage $V_{DC}$ is integrated by a ramp generator 36a until a reset pulse is received from the counter and logic circuit 32 over line 33a, thereby causing a ramp signal to be generated having a frequency and phase dependent upon the pulse train from the counter and logic circuit 32.

The signal from the ramp generator 36a is coupled to a comparator 38a which receives an error signal $V_E$. The signal $V_E$ is generated by summing the voltage delivered to the load at the point of regulation, or POR, with a reference signal in a summing junction 40 and processing the signal in a gain and compensation circuit 42. The comparator 38a develops a series of pulses which are connected to the logic and firing circuit 21.

The logic and firing circuit 21 also receives pulses from the other five ramp generator/comparator circuits 34b–34f and causes the rectifier elements SCR1–SCR6 to fire in proper sequence and at the proper point for each phase from the three-phase alternator 18.

The so-far described power conversion system is conventional. This system is capable of maintaining the output DC level at the desired level but only when the speed of the variable speed prime mover 14 is such that the output frequency of the alternator 18 is below a frequency on the order of 2500 Hz. At speeds above 2500 Hz., the logic and firing circuit 21 attempts to fire the rectifier elements SCR1–SCR6 at a rate equal to or exceeding their maximum switching rate, thereby resulting in undesired fluctuations in the output DC level. This problem becomes particularly acute when the power conversion system is used in conjunction with prime movers subject to wide fluctuations in output speed.

In order to overcome this problem, an overspeed comparator 44 compares the DC level $V_{DC}$ representing the output frequency of the alternator 18 with a reference level and generates a signal indicating whether the prime mover 14 is operating in an overspeed condition. The term "overspeed", when used in this context is defined as an alternator speed above which correct operation of the SCR's cannot be assured. When this signal from the overspeed comparator 44 is coupled to the logic and firing circuit 21, the full-wave SCR bridge 20 is operated in a half-wave rectification mode to gain additional time to fire the rectifier elements SCR1–SCR6.

Figure 3:
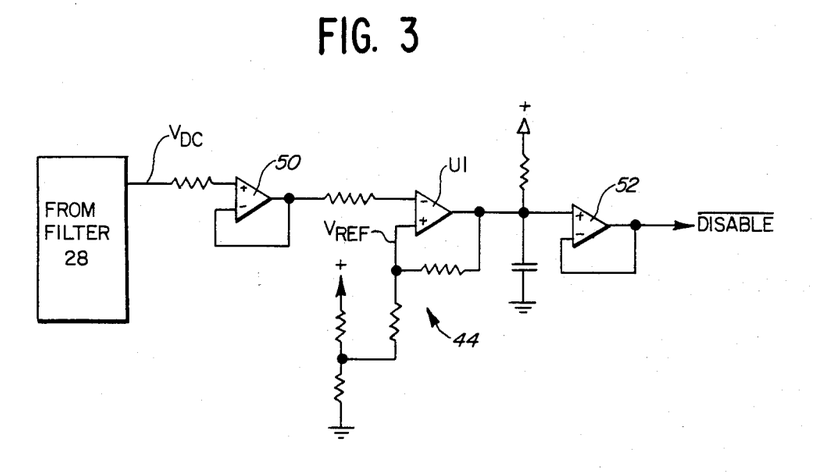
FIG. 3 is a schematic diagram of the overspeed comparator shown in block form in FIG. 1.

Referring now to FIG. 3, the overspeed comparator 44 includes a buffer 50 which isolates the signal $V_{DC}$. The buffered $V_{DC}$ signal is then coupled to an operational amplifier U1 connected as a comparator. The operational amplifier U1 also receives a signal $V_{REF}$ against which the buffered $V_{DC}$ signal is compared. The signal from the operational amplifier U1 is again buffered by a second buffer circuit 52 to generate a signal denoted $\overline{DISABLE}$.

Figure 4:
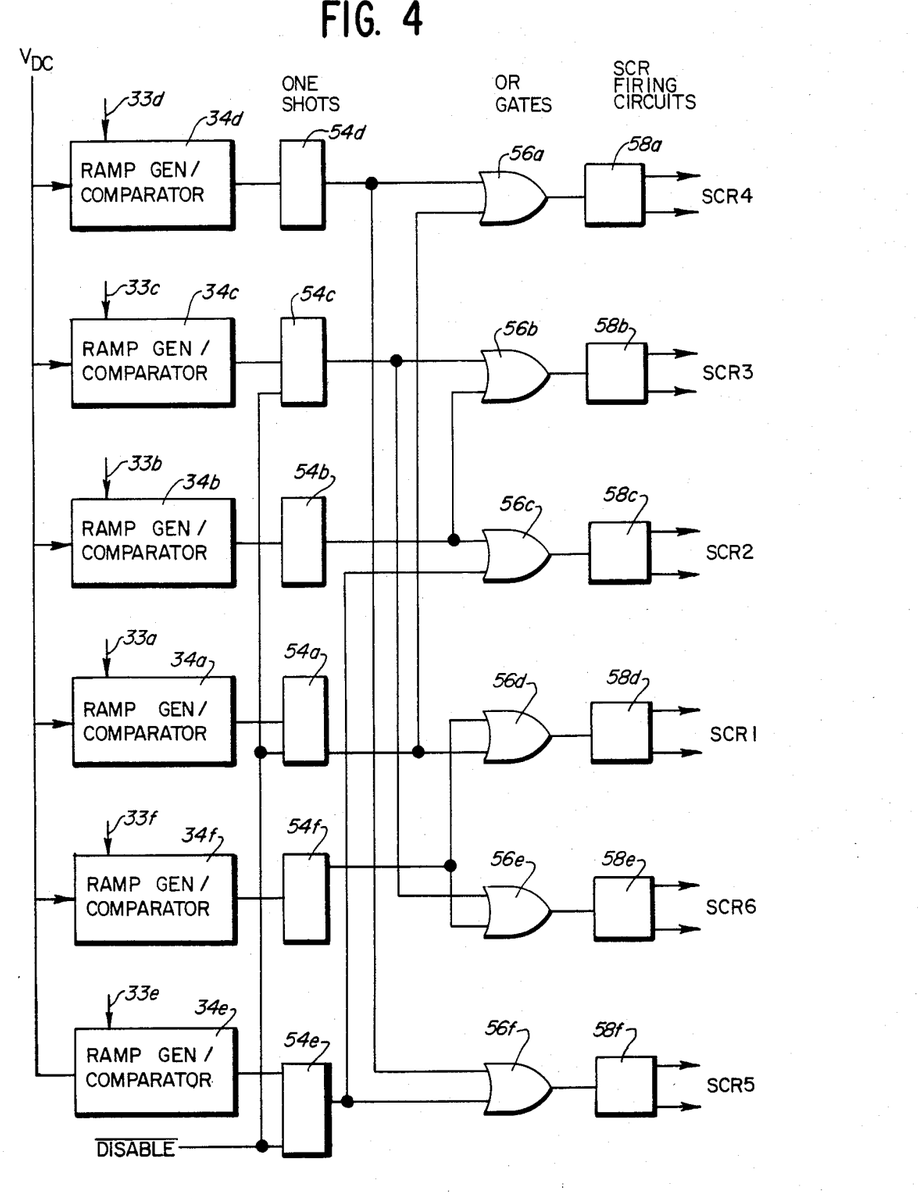
FIG. 4 is a detailed block diagram of the logic and firing circuit shown of FIG. 1.

Referring now to FIG. 4, the signal $\overline{DISABLE}$ is coupled to three of six one-shot multivibrators 54a–54f which also receive the pulses from the ramp generator/comparator circuits 34a–34f. In particular, the signal DISABLE is coupled to the one-shot multivibrators 54a, 54c, 54e to disable these one shots when the signal DISABLE is generated.

Each of the one-shot multivibrators 54a–54f is coupled to two of a series of six OR gates 56a–56f which are in turn coupled to six SCR firing circuits 58a–58f, respectively. The SCR firing circuits 58 control the firing of the rectifiers SCR1–SCR6 in the bridge 20.

Referring now to FIGS. 5–8, the operation of the circuitry shown in FIGS. 3 and 4 will be first described for normal operation, i.e. when the frequency of the alternator output is below a predetermined frequency, and then when an overspeed condition occurs, i.e. when the frequency of the alternator output is above the predetermined frequency.

Figure 5:
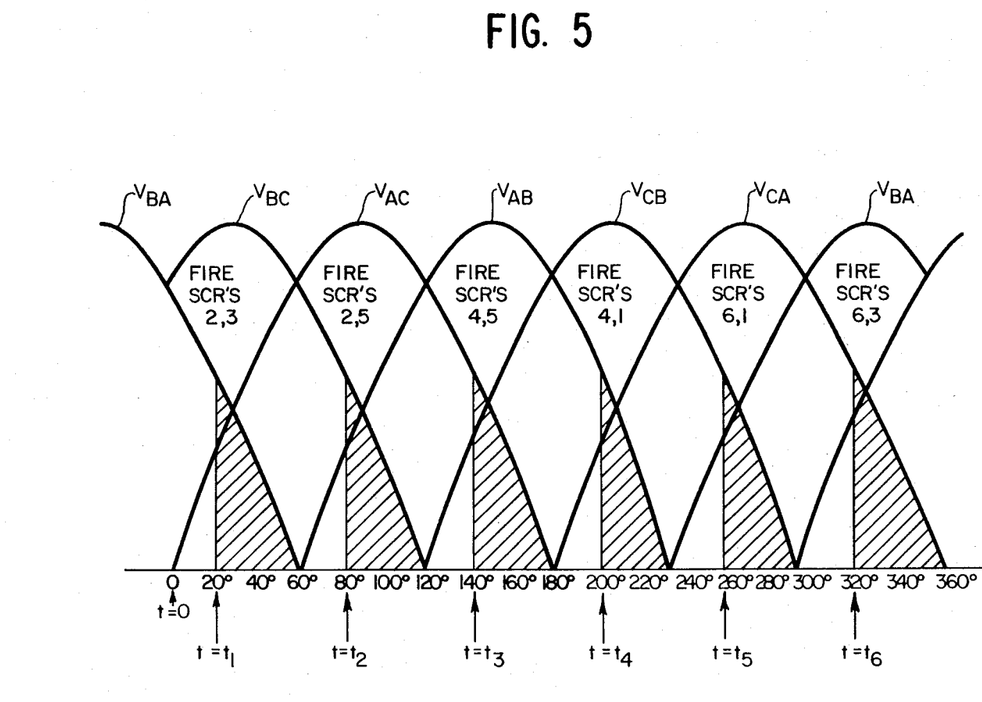
FIG. 5 is a waveform diagram illustrating the output of the full-wave SCR bridge when the frequency of the alternator output is below the predetermined frequency.
Figure 6:
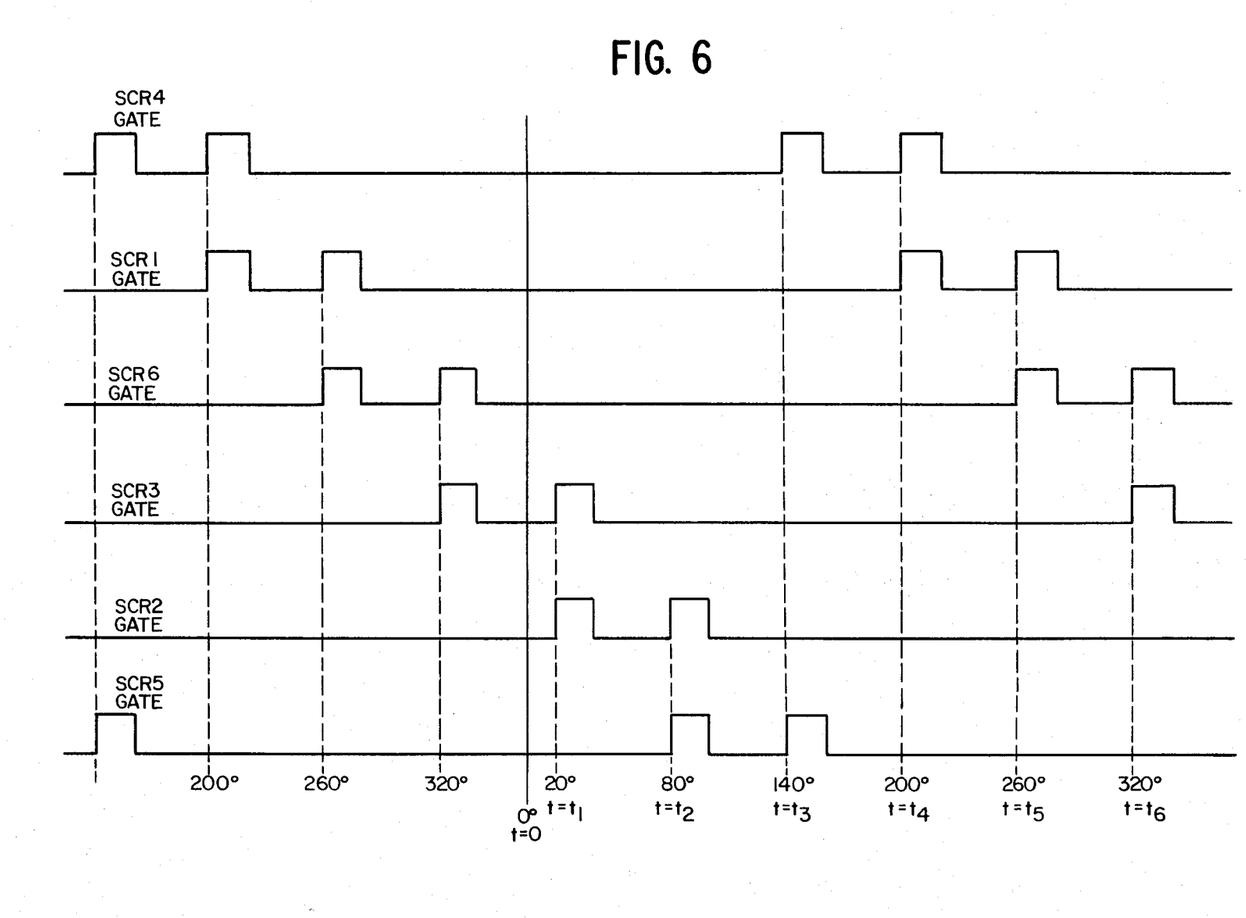
FIG. 6 is a waveform diagram illustrating the control pulses coupled to the SCR's in the full-wave bridge when the frequency of the alternator output is below the predetermined frequency.

Referring first to FIGS. 5 and 6, when the frequency of the alternator output is below the predetermined frequency, the control pulses generated by the firing circuit 21 cause the bridge 20 to operate as a full-wave rectifier to produce the waveform shown in FIG. 5. For example, at time $t=0$ (arbitrarily assigned the angle 0°) the voltage $V_{AC}$ representing the voltage across phases A and C is equal to zero while $V_{BA}$ and $V_{BC}$ (the voltage is between phases B and A and B and C, respectively) are at positive values.

Assume that the conditions at the point of regulation are such that it is necessary to fire the SCR's for 40° of each phase in order to maintain the voltage at the POR at the desired level. In this event, it is necessary to fire two of the rectifiers in the bridge 20 at 20°, or at the point in time designated $t=t_1$, in FIGS. 5 and 6. At $t=t_1$, a pulse is coupled over the line 33b from the counter and logic circuit 32 to the ramp generator/comparator circuit 34b. The pulse on the line 33b resets the ramp generator which then immediately begins to integrate the voltage $V_{DC}$. When the ramp signal reaches the level $V_E$, a pulse is generated by the comparator in the ramp generator/comparator circuit 34b, in turn causing the one-shot multivibrator 54b to develop a pulse. This pulse is coupled to the OR gates 56b,56c, in turn instructing the SCR firing circuits 58b,58c to fire rectifiers SCR2 and SCR3.

At a point 60° later in the waveform diagram of FIGS. 5 and 6, the counter and logic circuit 32 develops a pulse which is coupled over the line 33e, in turn causing the one-shot 54e to develop a pulse. The pulse is coupled to the OR gates 56c and 56f to fire the rectifiers SCR2 and SCR5.

Likewise, at 60° intervals following the firing of the rectifiers SCR2 and SCR5 (labeled as times $t=t_3$, $t_4$, $t_5$ and $t_6$) the appropriate pairs of SCR's are fired as noted below:

| Time (or angle) | Voltage | Rectifiers Fired |
|---|---|---|
| $t = t_3$ (140°) | $V_{AC}$ | SCR4, SCR5 |
| $t = t_4$ (200°) | $V_{AB}$ | SCR4, SCR1 |
| $t = t_5$ (260°) | $V_{CB}$ | SCR1, SCR6 |
| $t = t_6$ (320°) | $V_{CA}$ | SCR6, SCR3 |

Referring now to FIGS. 2, 3, 7 and 8, when the frequency of the alternator output is greater than the predetermined frequency, such as 2500 Hz., the overspeed comparator 44 generates the signal $\overline{\text{DISABLE}}$, in turn disabling the one-shots 54a, 54c and 54e. Accordingly, these one-shots can no longer generate pulses from the associated ramp generator/comparator circuits 34a, 34c and 34e. Hence, the OR gates 56a–56f only receive signals from the remaining one shots 54b, 54d and 54f in response to signals from the associated ramp generator/comparator circuits 34b, 34d and 34f, respectively.

Figure 7:
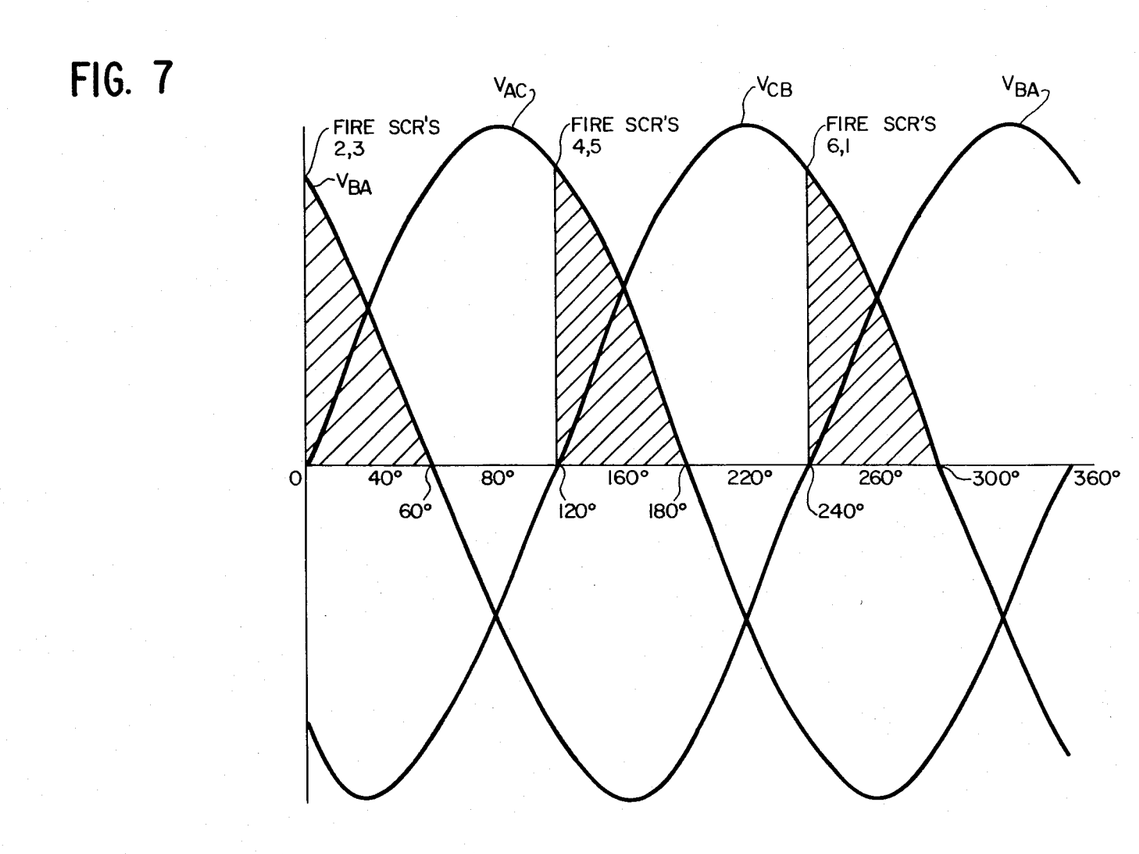
FIG. 7 is a waveform diagram illustrating the output of the bridge when the frequency of the alternator output is above the predetermined frequency.
Figure 8:
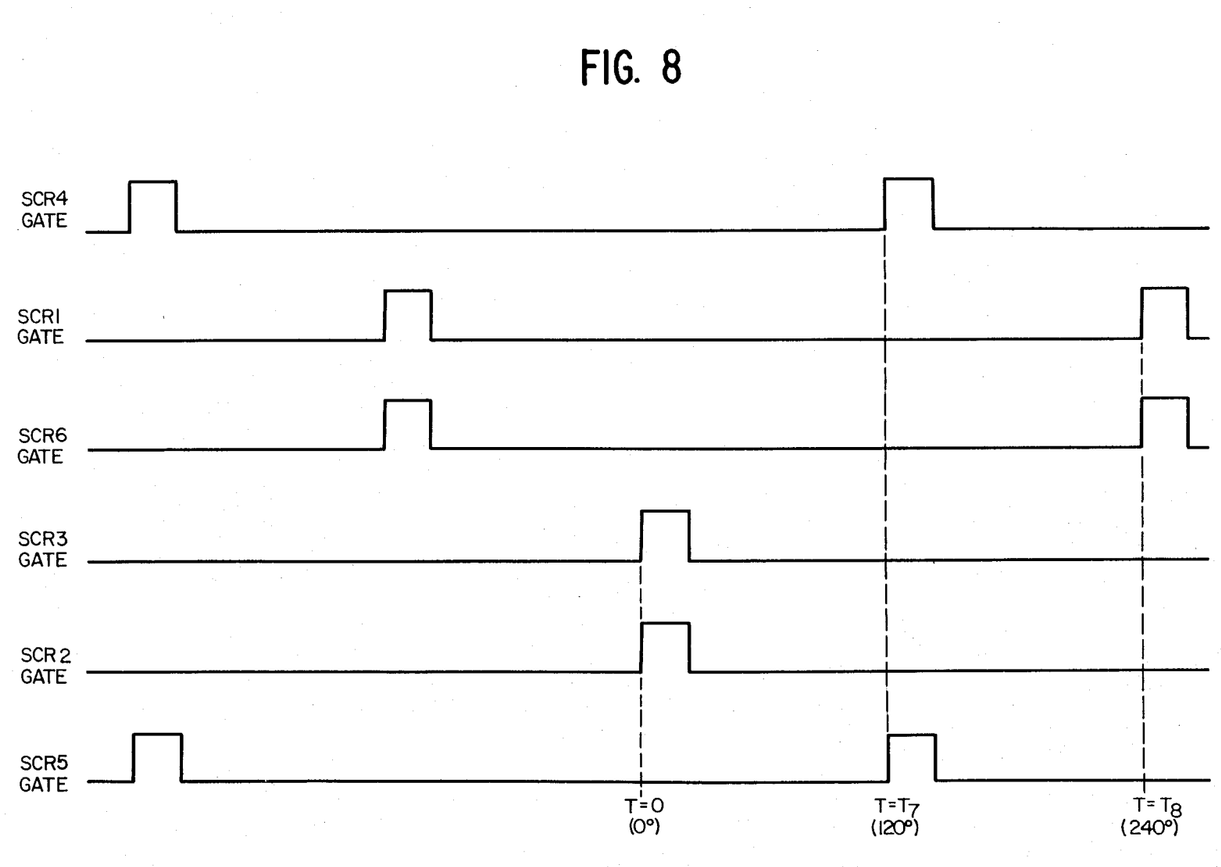
FIG. 8 is a waveform diagram illustrating the control pulses coupled to the SCR's in the bridge when the frequency of the alternator output is above the predetermined frequency.

As seen in FIG. 7, the effect of disabling the three one-shot multivibrators 54a, 54c and 54e is to change the operation of the bridge 20 to half-wave operation which produces the waveform shown in FIG. 7. In particular, at times t=0, i.e. at 0°, the rectifiers SCR2 and SCR3 are fired by the one-shot 54b as shown in FIG. 8.

Likewise, at times $t=t_7$ or at 120° of the waveform, the rectifiers SCR4 and SCR5 are fired by a pulse developed by the one-shot 54d while at times $t=t_8$ (240°) the rectifiers SCR1 and SCR6 are fired by a pulse generated by the one-shot 54f.

It can be seen that, when the bridge is operating to provide half-wave rectification, that the firing rate of the SCR's is decreased. Accordingly, the rectifiers SCR1'SCR6 are allowed a longer time to turn on and off, and reliable switching is assured.

Figure 9:
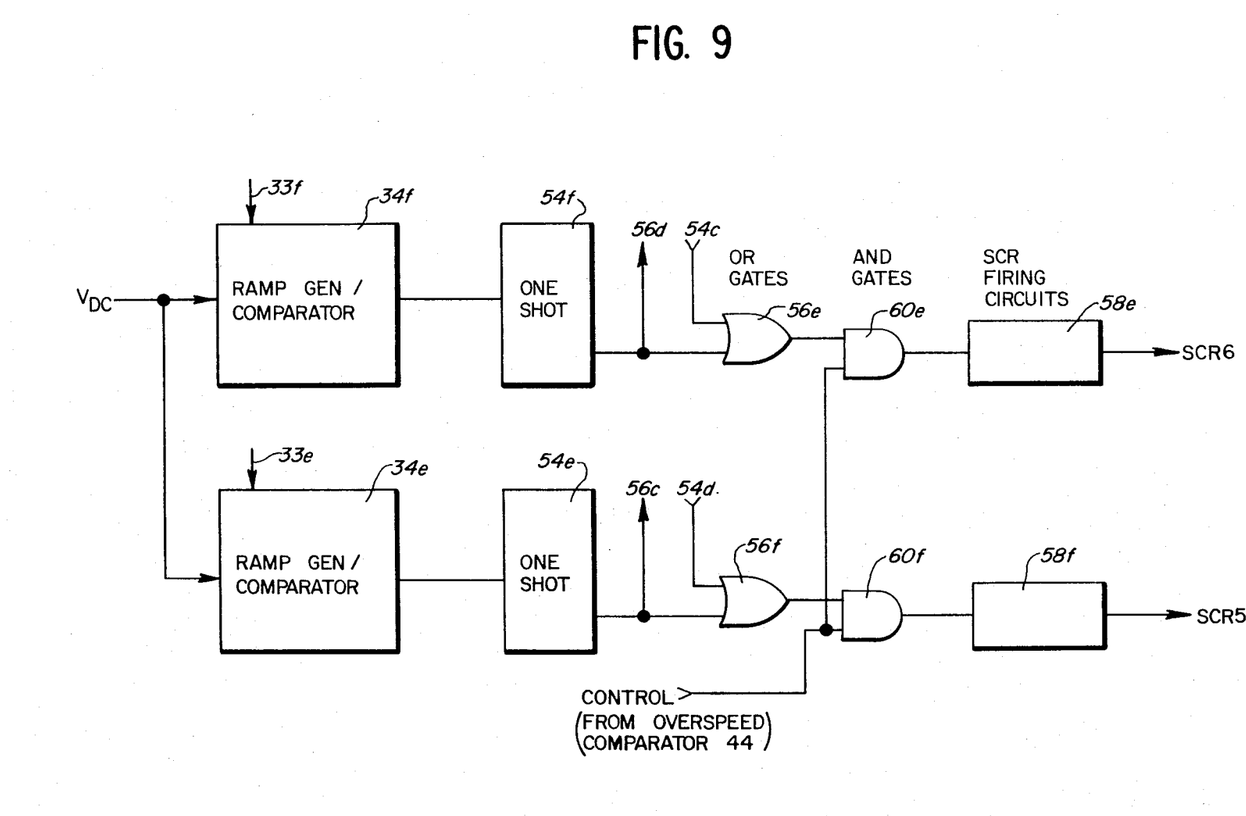
FIG. 9 is a partial block diagram of the logic and firing circuit showing a modification of FIG. 4.

In an alternate form of the invention, the firing of the two SCR's associated with one phase is prevented in an overspeed condition and the rectifier provides single phase full wave operation. FIG. 9 shows that portion of the logic and firing circuit of FIG. 4 which generates firing pulses for SCR's 5 and 6, phase C. Two input AND gates 60e, 60f are added between OR gates 56e, 56f and SCR firing circuits 58e, 58f. One input of each AND gate is connected with the output of the associated OR gate. The other input of the AND gates are connected together and with a source of control signal from overspeed comparator 44. So long as the alternator is operating below the predetermined frequency, a high control signal is provided to the AND gates and pulses from the OR gates 56 are connected with the firing circuits 58. In an overspeed condition the control signal is low and pulses are not conducted to the firing circuits, effectively disabling SCR's 5 and 6. Operation as a single phase full wave rectifier affords sufficient SCR switching time for reliable operation.

We claim:

1. In an electrical power system having an n-phase variable speed alternator, the frequency of the alternator being a function of speed, an n-phase full wave rectifier with 2n controlled rectifier elements connected with the alternator, the full wave rectifier having a DC output voltage, and a control circuit responsive to the DC output voltage of the rectifier to control the angle of conduction of the 2n rectifier elements for n-phase full wave rectification, an improved control, including:
   means for sensing the speed of the alternator;
   means responsive to an alternator speed exceeding a reference value for establishing an overspeed rectifier control signal; and
   overspeed control means, in said control circuit, responsive to said overspeed rectifier control signal for causing said control circuit to control conduction of said rectifier elements for less than n-phase, full wave rectification.

2. The electrical power system of claim 1 in which said overspeed control means causes said control circuit to control conduction of said 2n rectifier elements for n-phase half wave rectification.

3. The electrical power system of claim 1 in which said overspeed control means causes said control circuit to control conduction of said rectifier elements for m-phase full wave rectification, where m is less than n.

4. The electrical power system of claim 1 in which said control circuit includes means for generating 2n timing pulses and a logic circuit responsive to said 2n timing pulses for generating 4n firing pulses for n-phase full wave rectification, and said overspeed control means includes means for modifying operation of said logic circuit to control conduction of said rectifier elements for less than n-phase full wave operation of the rectifier.

5. The electrical power system of claim 4 in which said logic circuit includes a one-shot for each rectifier element, each one-shot being responsive to a timing pulse for producing a rectifier element firing pulse, and said means for modifying operation inhibits operation of a portion of the one-shots for n-phase half wave operation of the rectifier.

6. The electrical power system of claim 4 in which said logic circuit includes an AND gate through which firing pulses are connected with a portion of the rectifier elements, and said means for modifying operation inhibits operation of said AND gates, for m-phase full wave operation of the rectifier, where m is less than n.

7. In an electrical power system having a 3-phase variable speed alternator, the frequency of the alternator being a function of speed, a 3-phase full wave rectifier with six controlled rectifier elements connected with the alternator, the full wave rectifier having a DC output, and a control circuit responsive to the DC output voltage of the rectifier to control the angle of conduction of each of the six rectifier elements for 3-phase full wave rectification, an improved control, including:
   means for sensing the speed of the alternator;
   means responsive to an alternator speed exceeding a reference value for establishing a high speed rectifier control signal; and
   overspeed control means, in said control circuit, responsive to said high speed rectifier control signal for causing said control circuit to control conduction of said rectifier elements for less than 3-phase, full wave rectification.

8. The electrical power system of claim 7 in which said overspeed control means causes said control circuit to control conduction of said six rectifier elements for 3-phase half wave rectification.

9. The electrical power system of claim 7 in which said overspeed control means causes said control circuit to control conduction of four of said rectifier elements for single phase full wave rectification.

10. The electrical power system of claim 7 in which said control circuit includes means for generating six timing pulses and a logic circuit responsive to said six timing pulses for generating twelve firing pulses for 3-phase full wave rectification, and said overspeed control means includes means for modifying operation of the logic circuit to control conduction of said rectifier elements for less than 3-phase full wave operation of the rectifier.

11. The electrical power system of claim 10 in which said logic circuit includes a one-shot for each rectifier element, each one-shot being responsive to a timing pulse for producing a rectifier element firing pulse, and an OR gate for combining firing pulses from two one-shots for connection with each rectifier element.

12. The electrical power system of claim 11 in which the means for modifying operation inhibits operation of three one-shots for 3-phase half wave operation of the rectifier.

13. The electrical power system of claim 11 including AND gates connected between two of the OR gates and the associated rectifier elements and in which the means for modifying operation blocks passage of said firing pulses through said AND gates for single phase full wave operation of the rectifier.

* * * * *